(12) United States Patent
Chang et al.

(10) Patent No.: US 8,352,213 B2
(45) Date of Patent: *Jan. 8, 2013

(54) PROBE MONITORING SYSTEM FOR RIVERBED ELEVATION MONITORING AT BRIDGE PIERS

(75) Inventors: Wen-Yi Chang, Hsinchu (TW); Teng-Yi Yu, Hsinchu (TW); Jihn-Sung Lai, Hsinchu (TW); Whey-Fone Tsai, Hsinchu (TW); Franco Lin, Hsinchu (TW); Lung-Cheng Lee, Hsinchu (TW); Yu-Hui Liao, Hsinchu (TW); Ho-Cheng Lien, Hsinchu (TW); Chin-Hsiung Loh, Taipei (TW)

(73) Assignee: National Applied Research Laboratories, Hsinchu (TW)

( * ) Notice: Subject to any disclaimer, the term of this patent is extended or adjusted under 35 U.S.C. 154(b) by 292 days.

This patent is subject to a terminal disclaimer.

(21) Appl. No.: 12/833,224

(22) Filed: Jul. 9, 2010

(65) Prior Publication Data
US 2011/0255735 A1 Oct. 20, 2011

(30) Foreign Application Priority Data
Apr. 20, 2010 (TW) .............................. 99112265 A

(51) Int. Cl.
*G06F 15/00* (2006.01)
*G06K 9/00* (2006.01)

(52) U.S. Cl. ........................................ 702/166; 382/100
(58) Field of Classification Search .................. 702/166, 702/158, 188; 382/100, 106; 348/135, E07.085
See application file for complete search history.

(56) References Cited

U.S. PATENT DOCUMENTS
2011/0063434 A1 * 3/2011 Chang et al. .................. 348/135

* cited by examiner

*Primary Examiner* — Bryan Bui
(74) *Attorney, Agent, or Firm* — Rosenberg, Klein & Lee

(57) ABSTRACT

A probe monitoring system for riverbed elevation monitoring at bridge piers is revealed. The system includes a housing, a measuring rod, a moving member, a control module, a photographic unit and a sensing unit. The housing is fixed on the pier. Both the moving member for driving the measuring rod and the control module for control of the moving member are mounted in the housing. When the control module drives the measuring rod to move downward and the sensing unit on the bottom of the measuring rod approaches the riverbed, a sensing signal is sent to the control module. Thus the moving member stops moving the measuring rod and the photographic unit takes pictures of the measuring rod to generate an image. Then the riverbed elevation is obtained according to the image or the movement of the moving member and is sent to a remote monitor unit for real-time monitoring.

15 Claims, 5 Drawing Sheets

PROBE MONITORING SYSTEM FOR RIVERBED ELEVATION MONITORING AT BRIDGE PIERS

BACKGROUND OF THE INVENTION

1. Fields of the Invention

The present invention relates to a monitoring system for riverbed elevation monitoring at bridge piers, especially to a probe monitoring system for riverbed elevation monitoring at bridge piers.

2. Descriptions of Related Art

In recent years, natural disasters such as storms and associated flooding become more frequent and severe in countries all over the world. When the disaster comes, it causes serious flooding on the rivers and other streams so that the scour of the bridge foundations is becoming worse and this leads to exposure of bridge foundations. Thus the lateral load acting on the bridge pier is insufficient and the bridge may be tilted or broken. Once the flooding is too vast, the pier is washed away, the bridge collapses and people passing through the bridge may fall into the water. The above condition not only results in traffic interruption, but also great damages to human lives, common property and local construction. Now in order to observe the riverbed scour at bridge piers and make an alarm, a monitor system is developed. Thus the riverbed scour at bridge piers can be found as early as possible so as to assure the bridge safety and provide a precaution alarm. The traffic safety is ensured and the secondary damage caused by the broken bridge can be avoided. Moreover, the lifetime of the bridge is also extended by strengthening and repair taken in time. Furthermore, by long-term record of monitor data, a complete database of the bridge pier scour is established for bridge pier protection and riverbed restoration in the future.

Among a lot of technologies that monitor the bridge pier scour, the most common methods are followings:

Ground penetrating radar: is a non-destructive method that uses electromagnetic radiation in the high frequency band of the radio spectrum, and detects the reflected signals from subsurface structures. Thus the elevation changes of the riverbed under the water are obtained. The advantage of this method is that the changes in the riverbed elevation can be recorded continuously yet the shortcoming is that the operation is time-consuming and staffs require professional training.

Numbered bricks: a brick array formed by bricks with fixed size and sequential numbers is mounted under the riverbed at the upstream of bridge piers. When a flood comes, the riverbed elevation change is measured by the positions and numbers of the bricks swept away. The disadvantage of the method is that it requires to dig in the riverbed for mounting the brick array and each set of array can be used only once. Moreover, only the scour depth is learned while the sediment deposition is unable to detect.

Sliding magnetic collar: a slide bar with a hollow design is disposed on the surface of a bridge pier and a collar sleeve covers the slide bar. When the flood scours, the collar sleeve moves downward to provide the scour depth of a specific position. A magnetic sensor disposed in the slide bar moves along with the collar sleeve and sends movement signals to externals by wires. The disadvantage of this method is that it only records the scour depth but the sediment deposition is unable to detect.

Outdoor devices that monitor the water level: by an image capture device, an image of the water level is obtained. Then an image preprocessing is performed. That means a series of image processing steps are applied to the image. Then calculate the processed image to get the elevation of the water level. However, this method is not proper for monitoring the pier scour.

Auto-lens monitoring: refer to Taiwanese Pat. App. No. 098131157, a hollow container is embedded into the riverbed at a bridge pier and is fixed at the bridge pier. A photographic equipment for monitoring is mounted in the container and is disposed on a carrier. The carrier is moved vertically under control of a motor so as to monitor the sand scour around. When the bed surface rises due to deposition of sediment or falls due to scouring, a real-time image recognition system is used to detect the bed surface position. Thus either deposition of sediment or scouring can be detected. The disadvantage of this method is the riverbed excavation.

Gravity type scour measuring device: the sand surface falls due to scouring and the detector also falls along with the sand surface due to gravity. The elevation decreasing is measured so as to obtain the scour depth. The shortcoming of the method is the embedding of the measuring device and only the scour is detected. When sediments deposit, it is unable to detect.

Transmitter of scour monitoring for soil layer: a plurality of transmitters is embedded in the soil layer. When the sand surface is scoured to a certain degree, the transmitters are moved or vibrated to send signals so as to obtain the scouring of the sand surface. The disadvantage of the method is that the transmitters need to be mounted into the riverbed and only scouring is detected. As to the sediment being deposited on the riverbed, it just doesn't work.

Optical sensor: a measuring system that detects by fiber bragg grating. Once optical fiber is attached with medium, the refractive index in the optical fiber changes and wavelength shift occurs. Thus the depth of the medium can be estimated. The disadvantage of the method is that the optical fiber requires to be mounted into the riverbed and contact with the water surface or sand. Moreover, the optical fiber is fragile.

The monitor methods available now all have certain limitations in use. Generally, the riverbed is excavated for mounting the monitoring system therein or the monitoring system is disposable, used only once. The excavation and embedding are labor and cost intensive. This may cause damage to the bridge pier structure and affect the bridge safety. Thus how to monitor the riverbed scouring at bridge piers by new methods so as to extend the lifetime of the bridge and reduce the cost required has become an important issue now.

Thus there is a need to find out a new monitoring system for riverbed elevation monitoring at bridge piers that overcomes above shortcomings and monitors the riverbed elevation in real time with reduced cost.

SUMMARY OF THE INVENTION

Therefore it is a primary object of the present invention to provide a probe monitoring system for riverbed elevation monitoring at bridge piers in which a measuring rod is moved downward to the riverbed by a moving member under control of a control module. The probe monitoring system is disposed on a bridge pier. When the measuring rod approaches the riverbed, a photographic unit takes pictures of the measuring rod and generates images. According to the images, the control module gets the riverbed elevation at the bridge pier and sends data of the riverbed elevation to a remote monitor unit in real time for real-time monitoring of the riverbed elevation.

It is another object of the present invention to provide a probe monitoring system for riverbed elevation monitoring at bridge piers in which the control module controls the moving member to move the measuring rod downward. When the measuring rod approaches the riverbed, the control module obtains the distance moved by the measuring rod to the riverbed according to the movement of the moving member. Thus the riverbed elevation at the bridge pier is learned. And the data of the riverbed elevation is sent to the remote monitor unit in real time for real-time monitoring of the riverbed elevation.

It is a further object of the present invention to provide a probe monitoring system for riverbed elevation monitoring at bridge piers that is disposed above the riverbed. There is no need to dig in the riverbed for mounting the probe monitoring system. Thus the set-up of the system is simple and the cost is reduced.

It is a further object of the present invention to provide a probe monitoring system for riverbed elevation monitoring at bridge piers that obtains data of the riverbed elevation in real-time and sends the data of the riverbed elevation to the remote monitor unit for real-time monitoring and recording the riverbed elevation. Thus the data amount transmitted is reduced and the bandwidth consumption is reduced effectively.

In order to achieve above objects, a probe monitoring system for riverbed elevation monitoring at bridge piers of the present invention includes a housing, a measuring rod, a moving member, a control module, a photographic unit and a sensing unit. The housing is fixed on the bridge pier and the measuring rod marked with a plurality of scales is disposed on the housing. The moving member for driving the measuring rod to move is arranged in the housing. The control module is mounted in the housing and is coupled to the moving member for control of the moving member that moves the measuring rod. The photographic unit is set in the housing and is used to take pictures of the measuring rod for generating images. The sensing unit is disposed on the bottom of the measuring rod. When the measuring rod is moved downward to approach the riverbed, the sensing unit on the bottom of the measuring rod contacts the riverbed and sends a sensing signal to the control module so as to stop the moving member from moving the measuring rod. Moreover, the photographic unit is also controlled to take pictures of the measuring rod and generate images. The control module obtains the riverbed elevation around the pier according to images from the photographic unit and sends data of the riverbed elevation to a remote monitor unit for real-time monitoring and recording the riverbed elevation.

Furthermore, the control module of the present invention can also get the riverbed elevation at the bridge pier by the distance moved by the measuring rod to the riverbed and send data of the riverbed elevation to the remote monitor unit in real time for real-time monitoring of the riverbed elevation. The distance is obtained according to the movement of the moving member. The probe monitoring system of the present invention is set above the riverbed, not embedded in the riverbed. Thus there is no need to excavate the riverbed for mounting the system. Therefore, the simple set-up of the probe monitoring system saves both labor and cost.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
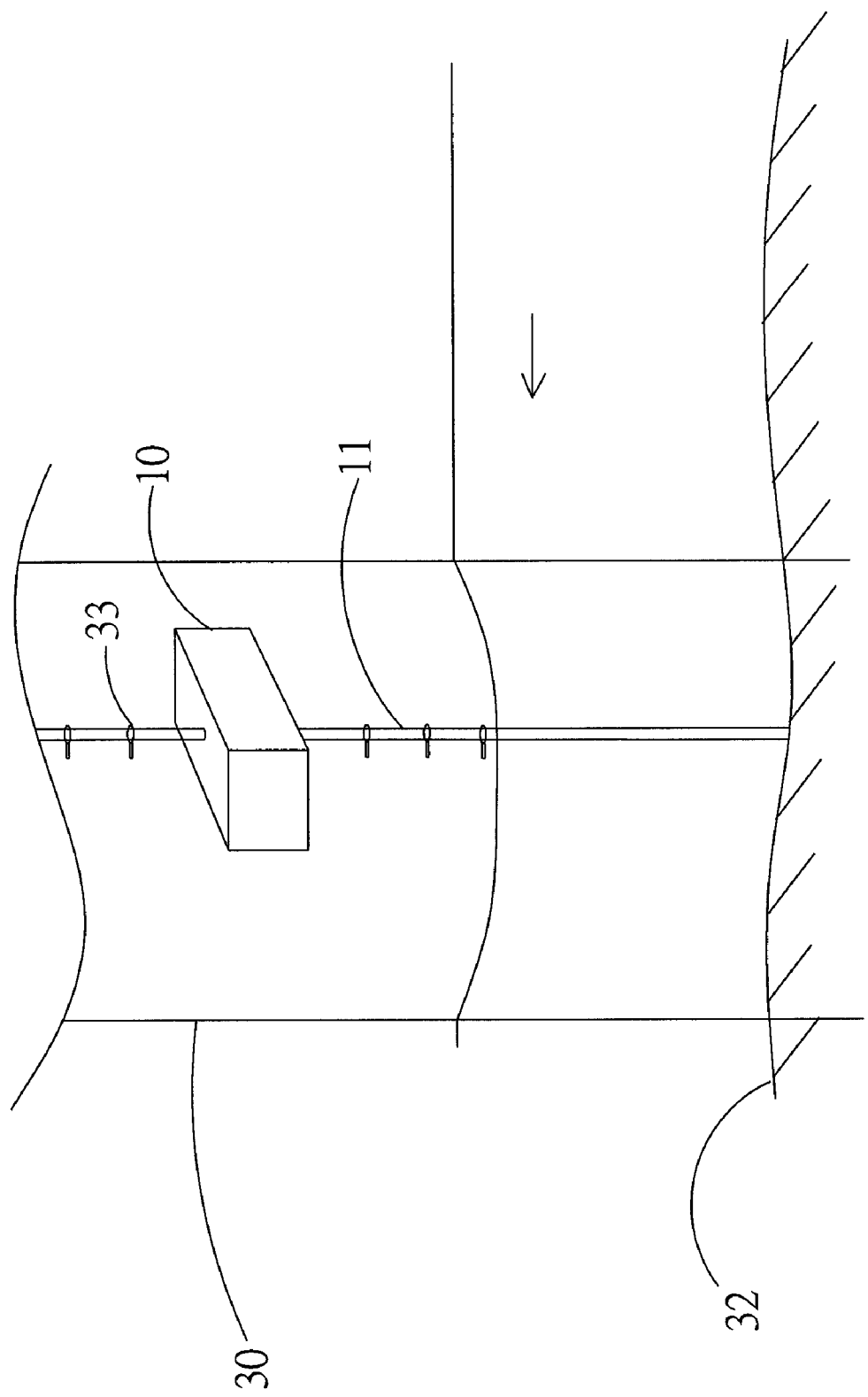
FIG. 1 is a schematic drawing showing an embodiment of the present invention arranged at a bridge pier.

Refer to FIG. 1, a probe monitoring system for riverbed elevation monitoring at bridge piers of the present invention is arranged at a bridge pier 30 and is used for real-time monitoring changes in the elevation of a riverbed 32 under the water. The probe monitoring system includes a housing 10 that is disposed on the bridge pier 30 by a certain way and is located above the water surface. The housing 10 is made of waterproof material with impact resistance such as steel to prevent rainwater from flowing into the housing 10 and avoid damages caused by impact. The system further consists of a measuring rod 11 that passes through the housing 10 and moves vertically so as to measure the riverbed 32 elevation. A plurality of fixing rings 33 is set on the bridge pier 30 and is used for fixing the measuring rod 11 on the bridge pier 30. The measuring rod 11 is moveable within the fixing rings 33.

Figure 2:
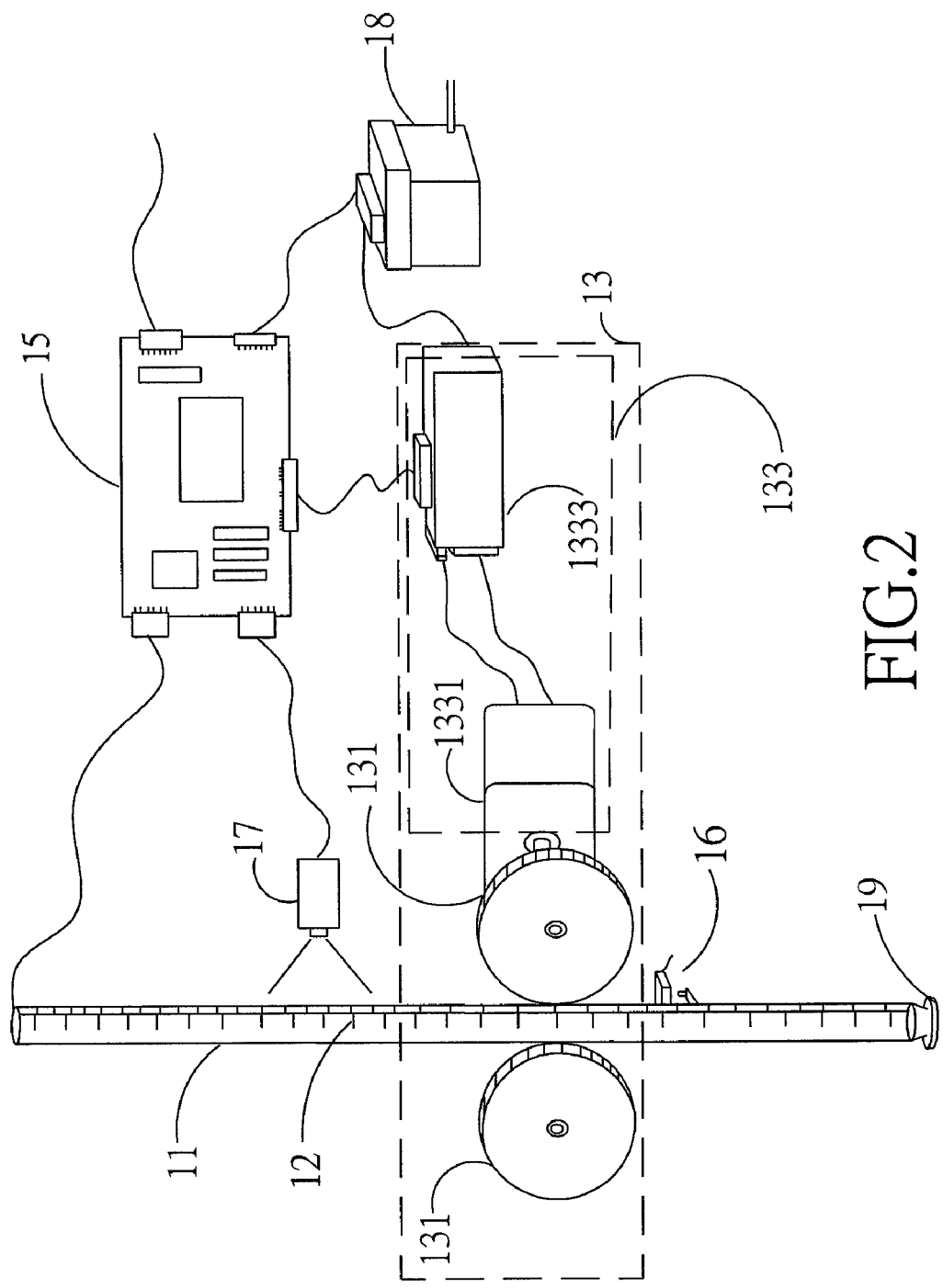
FIG. 2 is a schematic drawing showing structure of an embodiment according to the present invention.

Refer to FIG. 2, besides the housing 10 and the measuring rod 11, the probe monitoring system further includes a moving member 13, a control module 15, a photographic unit 17 and a sensing unit 19. A plurality of scales 12 is marked on the measuring rod 11 that penetrates the housing and moves vertically. The moving member 13 for driving the measuring rod 11 moving vertically is mounted in the housing 10. The control module 15 is also set inside the housing 10 and is coupled to the moving member 13 for control of the moving member 13 and the movement of the measuring rod 11. As to the photographic unit 17, it is mounted in the housing 10 and is coupled to the control module 15 so as to take images of the measuring rod 11 and the scales 12 and send the images to the control module 15. The photographic unit 17 is preferred a Charge Coupled Device (CCD) or other photographic equipment. The sensing unit 19 is disposed on the bottom of the measuring rod 11.

Figure 3:
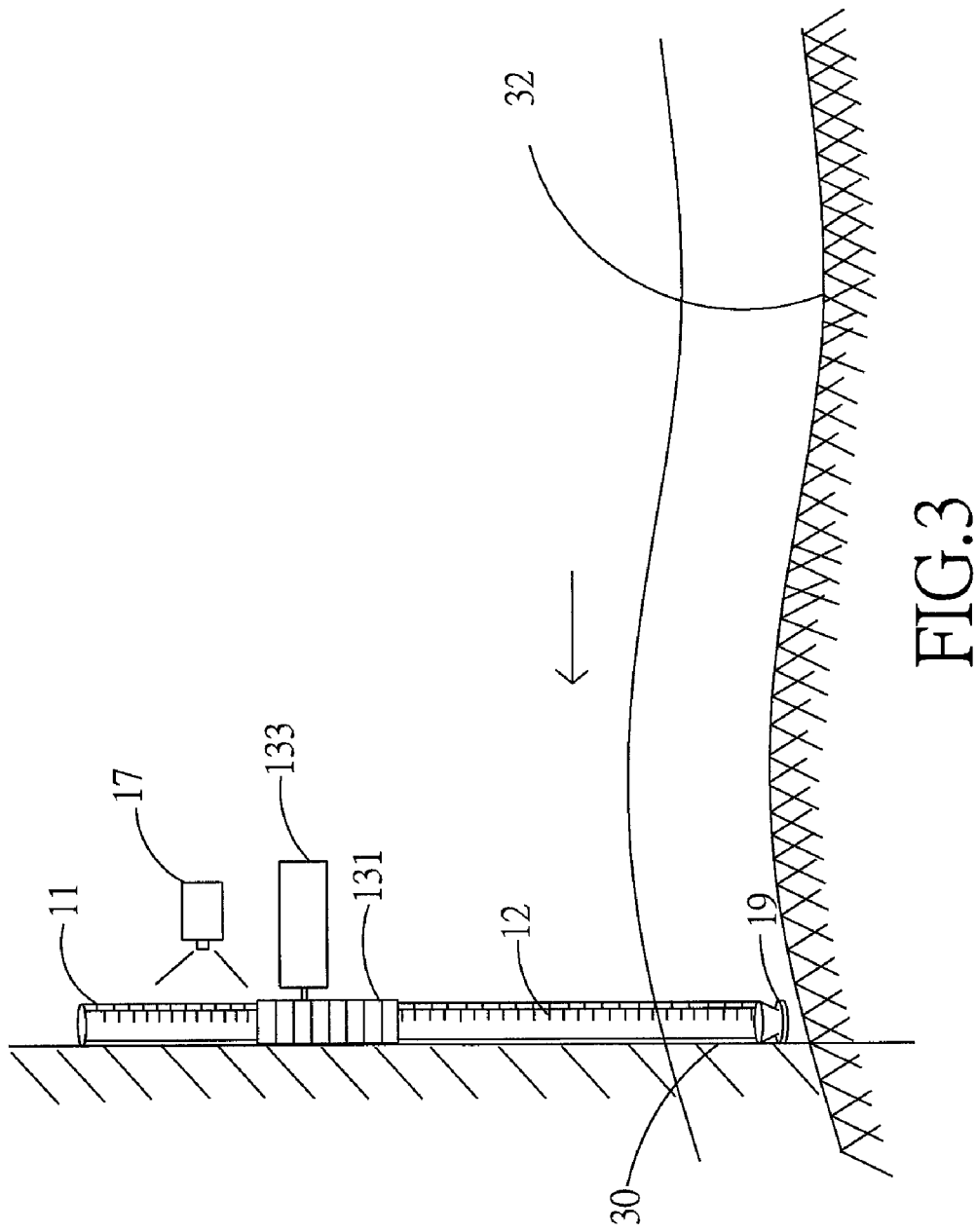
FIG. 3 is a schematic drawing showing how an embodiment of the present invention measures the riverbed elevation according to the present invention.

While monitoring the elevation of the riverbed 32, the control module 15 of the probe monitoring system of the present invention controls the moving member 13 to move for driving the measuring rod 11 moving downward (as shown in FIG. 3). When the bottom of the measuring rod 11 approaches the riverbed 32 and the sensing unit 19 contacts the riverbed 32, the sensing unit 19 sends a sensing signal to the control module 15 by a transmission line mounted in and passed through the measuring rod 11. After receiving the sensing signal, the control module 15 controls the moving member 13 to stop working for stopping the measuring rod 11. Refer to FIG. 3, the control module 15 enables the photographic unit 17 to take pictures of both the measuring rod 11 and the scale 12 and generate at least one image. Then the image is sent from the photographic unit 17 to the control module 15.

After receiving the image from the photographic unit 17, the control module 15 analyzes the image so as to get the scale in the image and obtain the elevation of the riverbed 32. In order to show how the photographic unit 17 captures images of the measuring rod 11, FIG. 3 just draws part of the structure of the monitoring system according to the present invention. After the control module 15 obtaining the data of the riverbed 32 elevation, the data is sent to a remote monitor unit 55 in FIG. 5 for real time monitoring of the riverbed 32 elevation. Thus the increasing/decreasing of the riverbed 32 elevation caused by sedimentation/scouring can be learned.

If the photographic unit 17 is not at a position corresponding to the zero of the scale 12 of the measuring rod 11 before the movement, the control module 15 enables the photographic unit 17 to take pictures of the measuring rod 11 before the movement of the measuring rod 11 so as to generate an initial image that is sent back to the control module 15 for analysis. After analyzing the initial image, the control module 15 obtains the initial number of the scale 12 of the photographic unit 17. Then the measuring rod 11 moves downward until it reaches the riverbed 32, the control module 15 again controls the photographic unit 17 to take pictures of the measuring rod 11 and generate an image. After image analysis, the control module 15 gets the number of the scale 12 in the image and compares the number with the initial number so as to learn the elevation of the riverbed 32 now.

The probe monitoring system of the present invention is arranged at the bridge pier 30, above the water surface. There is no need to embed the system in the riverbed in advance and the system is easy to set up. Moreover, there is no need to dig in the riverbed 32 so that the bridge pier 30 built upon will not be damaged. Furthermore, the position of the system being installed is determined and adjusted according to features of the rivers and the bridge pier 30 located. For example, if the river has flooding problem, the monitoring system is arranged at high places of the bridge pier 30. Or for the river with a lot of stones and gravel transported, the monitoring system is set up on the rear of the bridge pier 30.

The probe monitoring system of the present invention further includes a sensing unit 16 disposed on the measuring rod 11. When the control module 15 drives the moving member 13 to move for lifting the measuring rod 11, the sensing unit 16 is also moved along with the measuring rod 11. When the measuring rod 11 turns back to the initial position, the sensing unit 16 contacts the moving member 13 and sends a sensing signal to the control module 15. Thus the control module 15 controls the moving member 13 to stop moving according to the sensing signal and further stops the movement of the measuring rod 11. Therefore, the measuring rod 11 stops at the initial position. Moreover, the control module 15 can also get the distance moved by the measuring rod 11 according to the member of the scale obtained previously. In accordance with the distance moved, the control module 15 drives the moving member 13 to move so that the moving member 13 drives the measuring rod 11 moving up the same distance. Thus the measuring rod 11 is back to the initial position.

The probe monitoring system of the present invention further includes a power supply unit 18 that provides power to the system components such as the moving member 13 and the control module 15 etc. In a preferred embodiment of the present invention, the power supply unit 18 can be a utility power, a battery, a hydroelectric power unit or a photovoltaic energy unit. The way of the power supply unit 18 to supply power can be in a continuous manner or at a fixed-interval. The fixed-interval is set by a circuit that controls the power supply period of the power supply unit 18 to components of the system yet the power supplied to the control module 15 is maintained for continuing operation of the monitoring system. Thus the power is saved efficiently and the power supply period of the power supply unit 18 is increased. If the power supply unit 18 is used to provide power continuously that means 24 hours all the time for full-time monitoring of the riverbed 32 elevation changes, the power supply unit 18 can be a utility power, a photovoltaic energy unit or a hydroelectric power unit. Once a power failure occurs, the power supply unit 18 is turned to use a battery, a hydroelectric power unit or a photovoltaic energy unit. Moreover, the probe monitoring system of the present invention further includes at least one lighting unit (not shown in figure) mounted in the housing 10. The lighting unit provides the photographic unit 17 sufficient light for taking pictures. In a preferred embodiment, the lighting unit is a light emitting diode (LED) light.

Back to FIG. 2, the moving member 13 of the present invention further consists of a plurality of transmission units 131 and a driving module 133. The transmission units 131 are used to drive the measuring rod 11 to move vertically and the driving module 133 is used to drive the transmission units 131 to work for moving the measuring rod 11. The driving module 133 is coupled to and controlled by the control module 15. In a preferred embodiment of the present invention, the transmission units 131 are gears. The driving module 133 of the probe monitoring system further includes a motor 1331 and a motor drive unit 1333. The motor 1331 is connected to the transmission units 131 for driving the transmission units 131 and for control of the movement of the measuring rod 11. As to the motor drive unit 1333, it drives the motor 1331 to run. The motor drive unit 1333 is coupled to and controlled by the control module 15. In an embodiment, the motor 1331 is a stepper motor.

Figure 4:
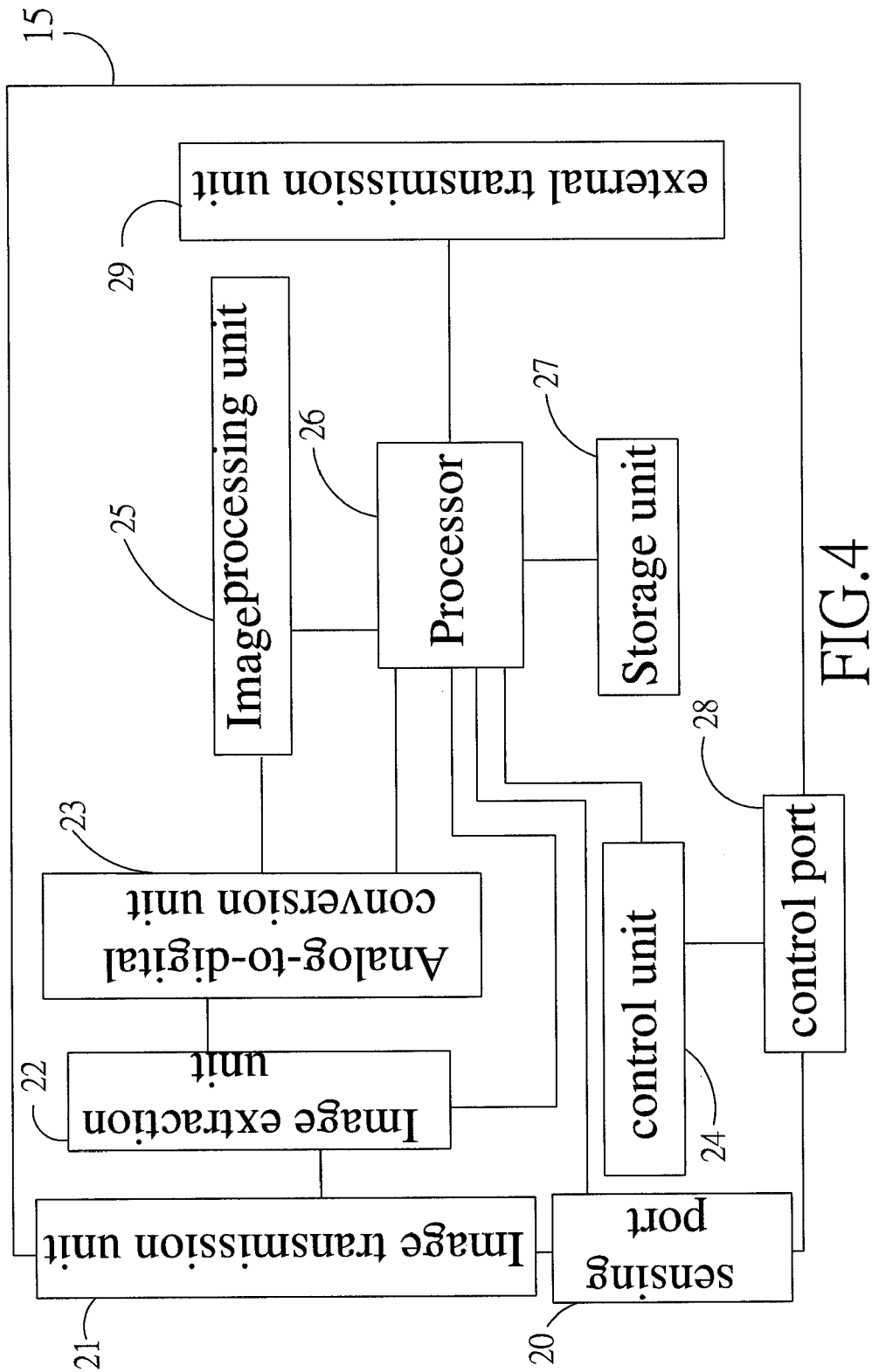
FIG. 4 is a block diagram of a control module of an embodiment according to the present invention.

Refer to FIG. 4, the control module 15 of the present invention is composed of a sensing port 20, an image transmission unit 21, an image extraction unit 22, an Analog-to-digital conversion unit 23, a control unit 24, an image processing unit 25, a processor 26, a storage unit 27, a control port 28, and an external transmission unit 29. The image transmission unit 21 which is an interface for image transmission is connected with the photographic unit 17 for sending images from the photographic unit 17. The image extraction unit 22 is coupled to the image transmission unit 21, capturing at least one image from the image transmission unit 21 and sending the captured image to the Analog-to-digital conversion unit 23. The Analog-to-digital conversion unit 23 converts the input monitoring image into a digital image. The digital image generated is sent to the image processing unit 25.

The image processing unit 25 is coupled to the Analog-to-digital conversion unit 23 and is used for digital image analysis so as to get the number of the scale on the measuring rod 11 in the image. According to the number of the scale got by the image processing unit 25, the processor 26 obtains the riverbed 32 elevation under the water surface. The image analysis in the image processing unit 25 uses techniques available now to get the number of the scale on the measuring rod 11 in the image and the processor 26 obtains the riverbed 32 elevation. The external transmission unit 29 is coupled to the processor 26, receiving and sending the riverbed 32 elevation to the remote monitor unit 55 (shown in FIG. 5). Thus people monitoring the riverbed can learn the riverbed 32 elevation changes and have long-term records for follow-up in the future.

All the data obtained has been processed completely in the control module 15. The external transmission unit 29 only sends the riverbed 32 elevation data to the remote monitor unit 55 outside. Thus the transmission requires minimum bandwidth. The riverbed 32 elevation change is also calculated by the control module 15 according to the riverbed 32 elevation now and the riverbed 32 elevation obtained last time. Then the control module 15 sends the riverbed 32 elevation change to the remote monitor unit 55. In a preferred embodiment, the external transmission unit 29 can be a wired transmission unit or a wireless transmission unit.

The processor 26 of the present invention is coupled to the image extraction unit 22 and the Analog-to-digital conversion unit 23 for control of the image extraction unit 22 and the Analog-to-digital conversion unit 23. The processor 26 further controls the photographic unit 17 through the image extraction unit 22 and the image transmission unit 21. Or the processor 26 is directly coupled to the photographic unit 17 for control of the photographic unit 17. The storage unit 27 that stores a system software is coupled to the processor 26 and the processor 26 executes the system software. The control unit 24 is coupled to the processor 26 for receiving a command from the processor 26 and generating a control signal according to the command from the processor 26. Then the control signal is sent to the control port 28 and is further sent to the moving member 13 (as shown in FIG. 2) for driving the moving member 13 to move. In a preferred embodiment, the control unit 24 is a motor control chip. The sensing port 20 is coupled to the sensing unit 19 in FIG. 2 for receiving the sensing signal generated from the sensing unit 19 and sending the sensing signal to the processor 26. After receiving the sensing signal, the processor 26 learns that the bottom of the measuring rod 11 approached the riverbed 32 and drives the control unit 24 to control the moving member 13, stopping the moving member 13 from moving the measuring rod 11.

Furthermore, the sensing port 20 is further coupled to the sensing unit 16 in FIG. 2. When the moving member 13 controls the measuring rod 11 to move upward and the sensing unit 16 contacts the moving member 13, the sensing unit 16 produces a sensing signal and sends the sensing signal to the processor 26 through the sensing port 20. The processor 26 receives the sensing signal from the sensing unit 16 and learns that the measuring rod 11 has turned back to the initial position. Then the processor 26 drives the control unit 24 to control the moving member 13 and stop the moving member 13 from moving the measuring rod 11.

In addition, the control module 15 can get the distance moved by the measuring rod 11 by analyzing the movement of the moving member 13 and further obtain the riverbed 32 elevation under the water surface. The control signal generated by the control unit 24 is for control of the movement of the moving member 13 so that the control signal represents the movement of the moving member 13. For example, the control unit 24 either causes the motor 1331 in FIG. 2 to rotate full turns or a certain number of steps or controls the transmission units 131 to rotate several turns. The processor 26 of the control module 15 gets the movement of the moving member 13 such as the number of turns of the motor 1331 or the transmission units 131 rotated by means of the control unit 24. By analyzing the movement of the moving member 13, the processor 26 further learns the distance moved by the measuring rod 11. According to the distance moved by the measuring rod 11 toward the riverbed 32, the riverbed 32 elevation is obtained. Altogether, the control module 15 of the present invention gets the riverbed 32 elevation by analyzing the images from the photographic unit 17 or by analyzing the movement of the moving member 13 so as to achieve real-time monitoring of the riverbed 32 elevation.

Figure 5:
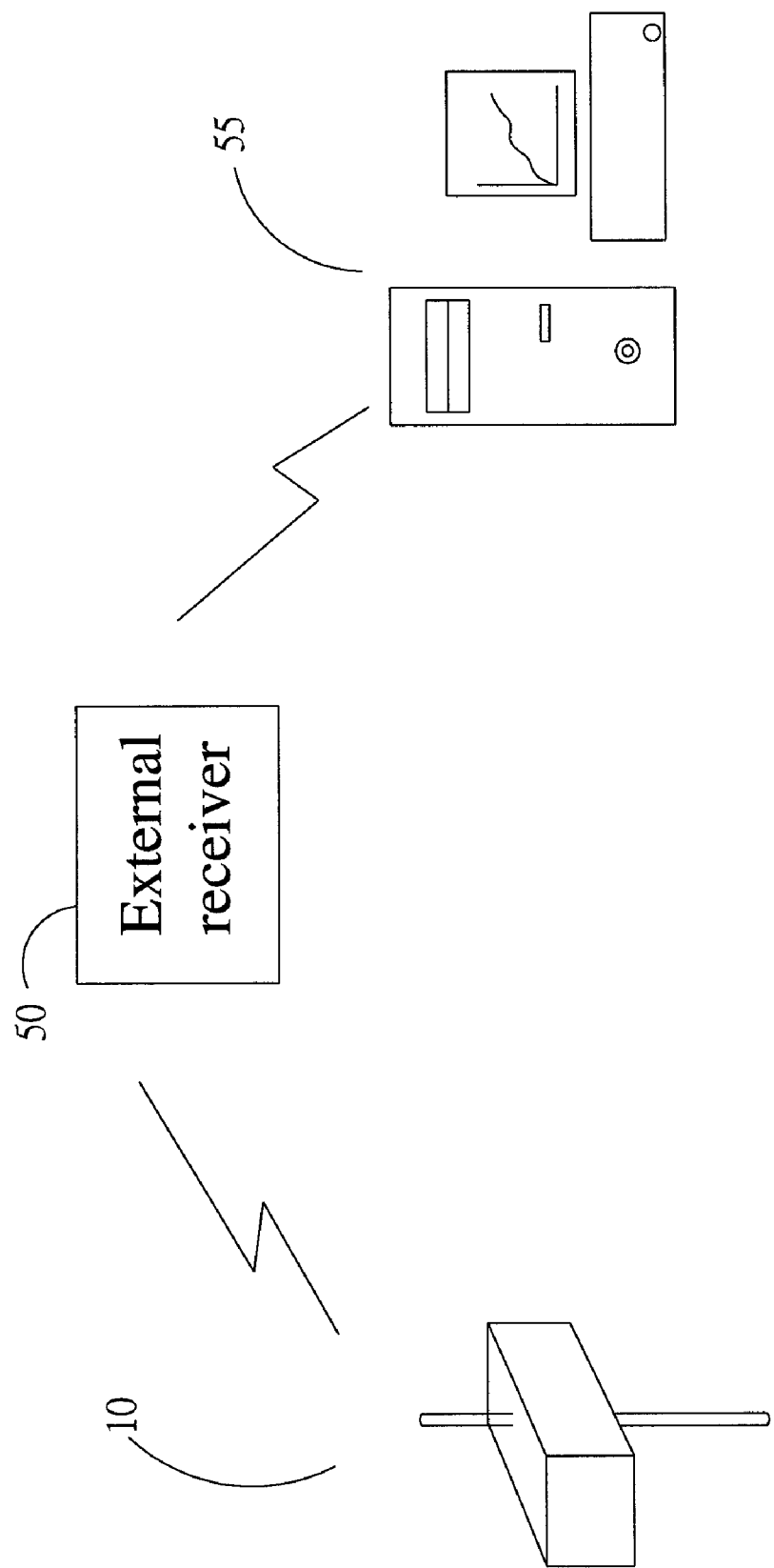
FIG. 5 is a schematic drawing showing a remote transmission in a monitoring system of the present invention.

Refer to FIG. 5, the elevation obtained is transmitted to the remote monitor unit 55. The control module 15 mounted in the housing 10 sends the elevation data to an external receiver 50 in a wired way or a wireless way and then to the remote monitor unit 55 through the external receiver 50. Thus people monitoring the riverbed 32 can learn the riverbed 32 elevation under the water surface and record the related data in the remote monitor unit 55 to build up a database for reference purposes in future. As shown in FIG. 5, a curve showing elevation changes is displayed on the remote monitor unit 55.

Moreover, the remote monitor unit 55 calculates the riverbed 32 elevation change according to the received riverbed 32 elevation. The remote monitor unit 55 of the present invention can be a computer or other electronic devices such as a personal digital assistant (PDA).

In summary, a probe monitoring system of the present invention includes a housing, a measuring rod, a moving member, a control module, a photographic unit and a sensing unit. The housing is fixed on the bridge pier and the measuring rod marked with a plurality of scales is arranged on the housing. The moving member for driving the measuring rod to move is disposed in the housing and the control module for control of the moving member is also mounted in the housing. The photographic unit is set in the housing and is used to take pictures of the scale on the measuring rod for generating images. The sensing unit is disposed on the bottom of the measuring rod. When the control module drives the measuring rod to move downward and the sensing unit approaches the riverbed, a sensing signal is sent to the control module so as to stop the moving member from moving the measuring rod. The control module controls the photographic unit to take pictures of the measuring rod and generate images. According to the images from the photographic unit, the control module gets the riverbed elevation at the bridge pier. Or the control module gets the distance moved by the measuring rod downward to the riverbed according to the movement of the moving member and further learns the riverbed elevation at the bridge pier. Moreover, the control module sends the riverbed elevation to a remote monitor unit in real-time so as to achieve a real-time monitoring of the riverbed elevation. Furthermore, there is no need to excavate the riverbed for mounting the probe monitoring system of the present invention into the riverbed. Thus the cost is reduced.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A probe monitoring system for riverbed elevation monitoring at bridge piers comprising:
    a housing fixed on a bridge pier,
    a measuring rod disposed on the housing and having a plurality of scales,
    a moving member mounted in the housing and driving the measuring rod to move,
    a control module arranged in the housing and coupled to the moving member for control of the moving member that drives the measuring rod,
    a photographic unit that is set in the housing, taking pictures of the measuring rod and generating at least one image, and
    a sensing unit disposed on a bottom of the measuring rod;
    wherein the control module controls movement of the measuring rod; once the sensing unit approaches a riverbed under the water, the sensing unit sends a sensing signal to the control module so as to control the moving member, stopping the moving member from moving the measuring rod and also to control the photographic unit take pictures of the measuring rod and generating at least one image; elevation of the riverbed is obtained according to the image and the elevation of the riverbed is sent to a remote monitor unit.

2. The device as claimed in claim 1, wherein the control module includes:

an image transmission unit coupled to the photographic unit and sending the image of the photographic unit, an image extraction unit coupled to the image transmission unit and capturing the image from the image transmission unit, an Analog-to-digital conversion unit coupled to the image extraction unit and converting the image captured by the image extraction unit to generate a digital image, an image processing unit coupled to the Analog-to-digital conversion unit, processing and analyzing the digital image so as to obtain the elevation of the riverbed, a processor coupled to the image processing unit and receiving the elevation of the riverbed, a storage unit coupled to the processor and storing a system software that is executed by the processor, an external transmission unit coupled to the processor and sending the elevation of the riverbed to the remote monitor unit, a control unit coupled to the processor, receiving a command from the processor and generating a control signal according to the command from the processor, and a control port coupled to the control unit for receiving the control signal and sending the control signal to the moving member for control of the moving member.

3. The device as claimed in claim 1, wherein the probe monitoring system for riverbed elevation monitoring at bridge piers further having:

a power supply unit coupled to the control module and the moving member for providing power and the power supply unit is a utility power, a battery, a hydroelectric power unit or a photovoltaic energy unit.

4. The device as claimed in claim 1, wherein the moving member includes:

a plurality of transmission units for driving the measuring rod to move, and a driving module controlled by the control module and used to drive the transmission units.

5. The device as claimed in claim 4, wherein the driving module includes:

a motor driving the transmission units to move for control of movement of the measuring rod, and a motor drive unit controlled by the control module and driving the motor to run.

6. The device as claimed in claim 4, wherein the transmission units are gears.

7. The device as claimed in claim 1, wherein the photographic unit is disposed with a lighting unit.

8. A probe monitoring system for riverbed elevation monitoring at bridge piers comprising:

a housing fixed on a bridge pier, a measuring rod disposed on the housing, a moving member mounted in the housing and driving the measuring rod to move, a control module arranged in the housing and coupled to the moving member for control of the moving member that drives the measuring rod, and a sensing unit disposed on the bottom of the measuring rod;

wherein the control module controls movement of the measuring rod; once the sensing unit approaches a riverbed under the water, the sensing unit sends a sensing signal to the control module so as to control the moving member, stopping the moving member from moving the measuring rod and the control module obtains elevation of the riverbed according to analysis of movement of the moving member and sends the elevation of the riverbed to a remote monitor unit.

9. The device as claimed in claim 8, wherein the control module includes:

a processor coupled for analyzing the movement of the moving member to obtain the elevation of the riverbed, a storage unit coupled to the processor and storing a system software that is executed by the processor, an external transmission unit coupled to the processor and sending the elevation of the riverbed to the remote monitor unit, a control unit coupled to the processor, receiving a command from the processor and generating a control signal according to the command from the processor for control of the moving member while the control signal represents the movement of the moving member, and a control port coupled to the control unit for receiving the control signal and sending the control signal to the moving member for control of the moving member.

10. The device as claimed in claim 8, wherein the probe monitoring system for riverbed elevation monitoring at bridge piers further having:

a power supply unit coupled to the control module and the moving member for providing power and the power supply unit is a utility power, a battery, a hydroelectric power unit or a photovoltaic energy unit.

11. The device as claimed in claim 8, wherein the moving member includes:

a plurality of transmission units for driving the measuring rod to move, and a driving module controlled by the control module and used to drive the transmission units.

12. The device as claimed in claim 11, wherein the driving module includes:

a motor driving the transmission units to move for control of movement of the measuring rod, and a motor drive unit controlled by the control module and driving the motor to run.

13. The device as claimed in claim 12, wherein the movement represents the number of turns the motor rotates.

14. The device as claimed in claim 11, wherein the transmission units are gears.

15. The device as claimed in claim 14, wherein the movement represents the number of turns the gears rotate.

* * * * *